United States Patent
Awiszus

(10) Patent No.: US 9,020,553 B2
(45) Date of Patent: *Apr. 28, 2015

(54) REMOTELY CONFIGURABLE WIRELESS INTERCOM SYSTEM FOR AN ESTABLISHMENT

(71) Applicant: 3M Innovative Properties Company, St. Paul, MN (US)

(72) Inventor: Steven T. Awiszus, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/186,986

(22) Filed: Feb. 21, 2014

(65) Prior Publication Data

US 2014/0170984 A1   Jun. 19, 2014

Related U.S. Application Data

(63) Continuation of application No. 13/214,746, filed on Aug. 22, 2011, now Pat. No. 8,694,040, which is a continuation of application No. 12/548,596, filed on Aug. 27, 2009, now Pat. No. 8,005,455, which is a continuation of application No. 11/276,048, filed on Feb. 10, 2006, now Pat. No. 7,599,679.

(51) Int. Cl.
*H04B 7/00* (2006.01)
*G06Q 50/12* (2012.01)
(Continued)

(52) U.S. Cl.
CPC ............ *G06Q 50/12* (2013.01); *H04M 1/72502* (2013.01); *H04M 1/72513* (2013.01); *G06Q 30/0623* (2013.01); *H04B 17/0022* (2013.01)

(58) Field of Classification Search
USPC .......................... 455/517, 403, 73, 569.1, 63
See application file for complete search history.

(56) References Cited

U.S. PATENT DOCUMENTS

| 5,321,848 A | 6/1994 | Miyahira |
| 5,721,783 A | 2/1998 | Anderson |

(Continued)

FOREIGN PATENT DOCUMENTS

| EP | 1372299 | 12/2003 |
| GB | 1291743 | 10/1972 |

(Continued)

OTHER PUBLICATIONS

File history for co-pending U.S. Appl. No. 12/548,596, filed Aug. 27, 2009, entitled "Remotely Configurable Wireless Intercom System for an Establishment" (108 pgs.).

(Continued)

*Primary Examiner* — David Q Nguyen
(74) *Attorney, Agent, or Firm* — David B. Patchett

(57) ABSTRACT

Systems and methods associated with an intercom system for a drive-through, quick service restaurant facility is disclosed. Generally, a plurality of headsets is configured for communication with a base station. A speaker is associated with the drive-through facility is configured to be located near a menu board, and is configured for communication with the base station. A microphone is also configured to be located near the menu board and configured for communication with the base station. A plurality of parameters control the configuration of the intercom system, and the base station is connectable to a wide area communication network to enable remote adjustment of the plurality of parameters.

32 Claims, 3 Drawing Sheets

(51) Int. Cl.
  *H04M 1/725* (2006.01)
  *G06Q 30/06* (2012.01)
  *H04B 17/00* (2006.01)

(56) References Cited

U.S. PATENT DOCUMENTS

| | | | |
|---|---|---|---|
| 6,435,406 | B1 | 8/2002 | Pentel |
| 6,574,603 | B1 | 6/2003 | Dickson |
| 6,816,205 | B2 | 11/2004 | Dudkowski |
| 6,856,817 | B2 | 2/2005 | Tischler |
| 6,993,292 | B2 | 1/2006 | Sabongi |
| 7,120,388 | B2 | 10/2006 | Hall |
| 7,177,824 | B2 | 2/2007 | Sabongi |
| 7,231,233 | B2 | 6/2007 | Gosieski |
| 7,599,679 | B2 | 10/2009 | Awiszus |
| 7,761,063 | B2 | 7/2010 | Tsuda |
| 7,920,539 | B2 | 4/2011 | Stanford |
| 8,694,040 | B2 * | 4/2014 | Awiszus ................ 455/517 |
| 2003/0134666 | A1 | 7/2003 | Fletcher |
| 2003/0225622 | A1 | 12/2003 | Doan |
| 2004/0158499 | A1 | 8/2004 | Dev |
| 2004/0204168 | A1 | 10/2004 | Laurila |
| 2005/0004843 | A1 | 1/2005 | Heflin |
| 2005/0059414 | A1 | 3/2005 | Mahmoodi |
| 2005/0079885 | A1 | 4/2005 | Patino |
| 2005/0135458 | A1 | 6/2005 | Graves |
| 2005/0277410 | A1 | 12/2005 | Ismail |
| 2006/0030269 | A1 | 2/2006 | Sabongi |
| 2006/0041482 | A1 | 2/2006 | Awiszus |
| 2009/0318076 | A1 | 12/2009 | Awiszus |

FOREIGN PATENT DOCUMENTS

| | | |
|---|---|---|
| WO | WO 9610878 | 4/1996 |
| WO | WO 2007-094981 | 8/2007 |

OTHER PUBLICATIONS

First Examination Report dated Jan. 18, 2010 for co-pending New Zealand Patent Application No. 570370, filed Aug. 27, 2009, entitled "Remotely Configurable Wireless Intercom System for an Establishment" (2 pgs.).

Office Action dated May 10, 2010 for co-pending Australian Patent Application No. 2007215462, filed Aug. 27, 2009, entitled "Remotely Configurable Wireless Intercom System for an Establishment" (2 pgs.).

"Extended European Search Report", for PCT/US2007/002961, mailed May 7, 2013 (6 pages).

"Answer to Defendant HM Electronics's Counterclaims", *3M Company and 3M Innovative Properties Company v. HM Electronics, Inc.*, Civil Action No. 12-cv-553 SRN/JSM, Filed Jun. 14, 2012.

"Complaint", *3M Company and 3M Innovative Properties Company v. HM Electronics, Inc.*, Civil Action No. 12-cv-553 SRN/JSM, Filed Mar. 2, 2012.

"Defendant's Answer, Affirmative Defenses and Counterclaims to Plaintiffs' Complaint for Patent Infringement", *3M Company and 3M Innovative Properties Company v. HM Electronics, Inc.*, Civil Action No. 12-cv-553 SRN/JSM, Filed May 25, 2012.

"Order Staying Case Pending Reexamination", *3M Company and 3M Innovative Properties Company v. HM Electronics, Inc.*, Civil Action No. 12-cv-553 SRN/JSM, Filed Sep. 21, 2012.

"Third Party Comments After Patent Owner's Response Pursuant to 37 cfr 1.947", Filed in Inter Partes Reexamination Application No. 95/002,238 on Feb. 14, 2013.

"Third Party Comments After Patent Owner's Response Pursuant to 37 cfr 1.947", Filed in Inter Partes Reexamination Application No. 95/002,239 on Mar. 8, 2013.

"Third Party Comments After Patent Owner's Response to the Action Closing Prosecution Pursuant to 37 C.F. R. § 1.947", for U.S. Appl. No. 95/002,239 (3M file 61312USRX2), mailed Oct. 21, 2013 (24 pages).

"3M Wireless Intercom System Service Information", Copyright Mar. 2003, pp. 1-18.

"EtherPath User's Guide", Copyright 1998 . . . 2004, Revised Jun. 3, 2004, pp. 1-92.

"Examination Report", dated Sep. 22, 2011, from NZ Application No. 595259, corresponding to U.S. Appl. No. 11/276,048 (pp. 2).

"Examination Report", NZ Application No. 595104 (our file 102.0105NZD1), mailed Sep. 15, 2011 (pp. 1-3).

"Examination Response", dated Nov. 3, 2011, from NZ Application No. 570370, corresponding to U.S. Appl. No. 11/276,048 (pp. 2).

"Handbook of Intercom Systems Engineering", Copyright 2000, Revised Mar. 2002, pp. 1-168.

"HM Electronics PRO850 Wireless Intercom Operating Instructions", Copyright Sep. 2003, Revised Sep. 11, 2003, pp. 1-45.

Vu, Tuyet, "HME's New PRO850 Wireless Intercom System Offers More Flexibility and Operation Power to Pro-Audio Professionals", PRO3-10, Sep. 2, 2003 (1 page).

White, Ron, "How Computer's Work", Indianapolis, IN: Que, 2006. Print. (6 pages).

"Japanese Office Action", from JP Application No. 2008-544285 (our file 102.0105JPW0), mailed May 29, 2012, (4 pages) English translation.

Lantronix Secure Com Port Redirector User Guide, Copyright 2004, Revision B, Dec. 2004, pp. 1-24.

"Non-Final Office Action", mailed Dec. 6, 2012 in co-pending U.S. Appl. No. 95/002,239 (our file 102.0105USR2), "Remotely Configurable Wireless Intercom System for an Establishment," (35 pages).

"Office Action", mailed Nov. 15, 2012 in co-pending U.S. Appl. No. 95/002,238 (our file 102.0105USRX), "Remotely Configurable Wireless Intercom System for an Establishment," (45 pages).

"PC30 Software Version 2.1, for HME System 30, Installation and Operating Instructions", HM Electronics, Inc., Nov. 2003, 104 pages.

"PCT International Preliminary Report on Patentability", from International Application No. PCT/US2007/002961, corresponding to U.S. Appl. No. 11/276,048, dated Jun. 28, 2007, pp. 1-6.

"Response to First Examiner's Report", dated May 10, 2010 from AU Application No. 2007215462, corresponding to U.S. Appl. No. 11/276,048, mailed Jun. 1, 2011 (pp. 10).

"Response to First Examiner's Report", dated Sep. 15, 2011, from NZ Application No. 595104, corresponding to U.S. Appl. No. 11/276,048, mailed Dec. 6, 2012 (3 pags).

"Response to Non-Final Office Action mailed Dec. 6, 2012", filed with USPTO Feb. 6, 2013 in co-pending U.S. Appl. No. 95/002,239 (our file 102.0105USR2), (78 pages).

"Response to Office Action mailed Nov. 15, 2012", filed with USPTO Jan. 15, 2013 in co-pending U.S. Appl. No. 95/002,238 (our file 102.0105USRX), (75 pages).

"Symantec pcAnywhere User's Guide", Copyright 2003, pp. 1-212.

"System 30, Drive-Thru Timer System, Operating Instructions", HM Electronics, Inc., Nov. 2002, 99 pages.

"Telex Operating Instructions RadioCom BTR-800, TR-800 Professional Wireless Intercom System", Jun. 2002, pp. 1-73.

"Wireless 6000 Wireless Drive-Thru Audio System Installation Instructions, by HM Electronics", Copyright Aug. 2003, pp. 1-50.

"Request for Inter Partes Reexamination (37 CFR 1.913)" filed with USPTO Sep. 13, 2012 in US Patent No. 8,005,455, (102.0105USR2), (123 pages).

"Request for Inter Partes Reexamination (37 CFR 1.913)" filed with USPTO Sep. 13, 2012 in US Patent No. 7,599,679, (102.010USRX) (147 pages).

"Action Closing Prosecution", for U.S. Appl. No. 95/002,239, mailed Jul. 19, 2013 (65 pages).

* cited by examiner

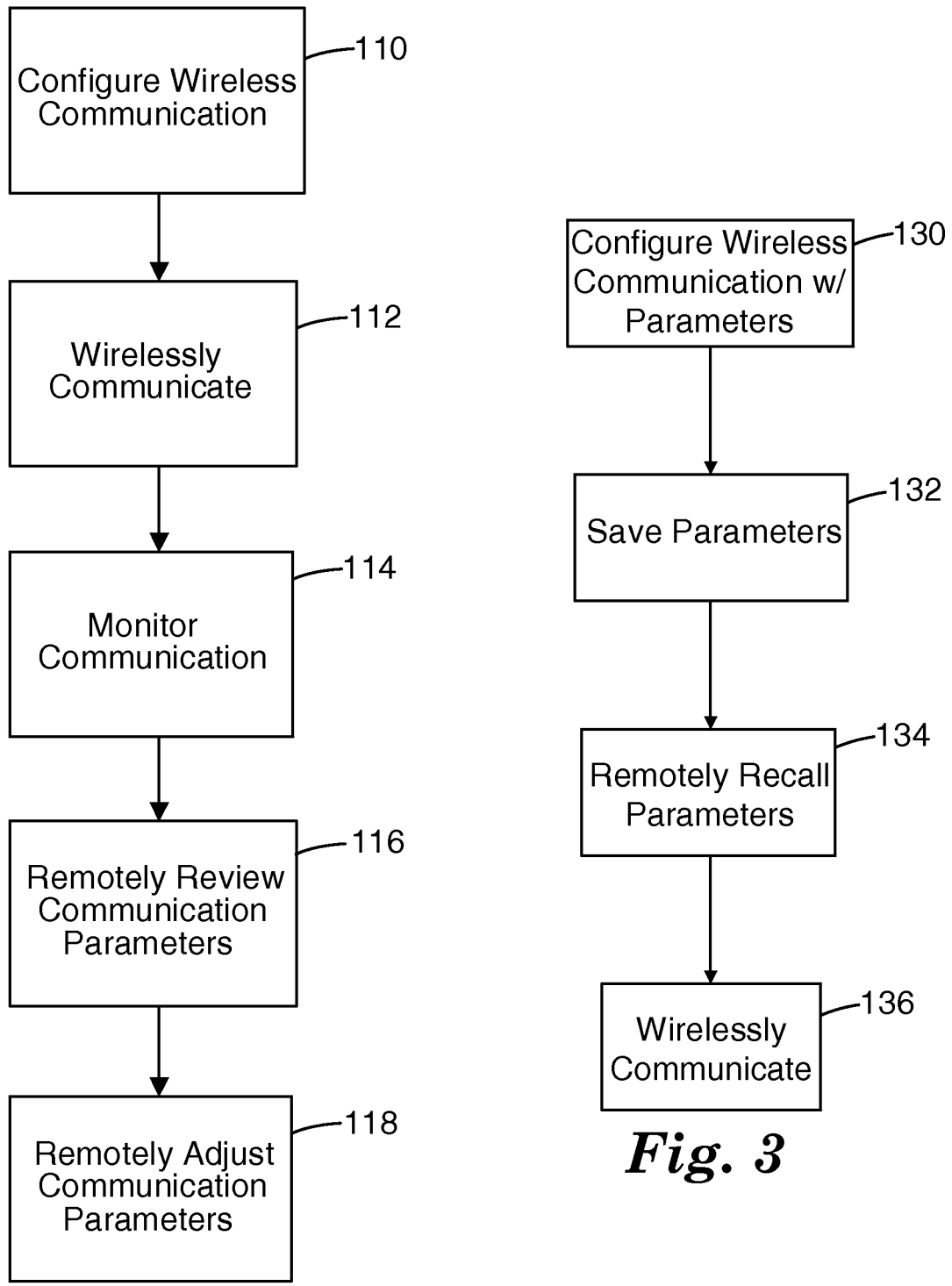

REMOTELY CONFIGURABLE WIRELESS INTERCOM SYSTEM FOR AN ESTABLISHMENT

CROSS REFERENCE TO RELATED APPLICATIONS

This application is a continuation of U.S. application Ser. No. 13/214,746 filed Aug. 22, 2011, now allowed; which is a continuation of U.S. application Ser. No. 12/548,596, filed Aug. 27, 2009 (issued as U.S. Pat. No. 8,005,455); which is a continuation of U.S. application Ser. No. 11/276,048 (issued as U.S. Pat. No. 7,599,679), filed Feb. 10, 2006, the disclosures of which are incorporated by reference in its entirety herein.

FIELD OF THE INVENTION

The present invention is generally related to wireless intercom systems and, more particularly, to wireless intercom systems for commercial establishments.

BACKGROUND OF THE INVENTION

It is common for establishments, such as retail establishments, and particularly restaurants, to facilitate drive-up customers with drive-up lanes and windows to service the customer. A customer will typically drive up to a menu/order board and communicate the customer's wishes from the vehicle to staff, including an order taker, inside the retail establishment. The customer, still in the vehicle, will then proceed to one or more windows in order to pay for the purchase, if required, and pick up the merchandise.

An intercom system can facilitate communication within and around the establishment, particularly between the occupant of the vehicle, the customer, and the staff inside the establishment. In a "quick service" restaurant situation, a post mounted speaker and microphone, located near a menu board, is hard wired to an intercom base station located inside the restaurant. The base station can wirelessly communicate with a portable device worn by an order taker. The portable device is typically a transceiver worn as a belt pack and an accompanied wired headset. Alternatively, in some instances, the portable device is self-contained on a wearable headset eliminating the need for a belt pack. The order taker typically listens continually to the post mounted microphone and presses a button in order to speak to the vehicle occupant as needed.

In many systems and methods of ordering items from an establishment from a drive-up or drive-thru facility, the order is orally communicated directly from the post-mounted speaker and microphone to an order taking facility, typically a drive-thru order specialist wearing a headset, in the establishment. The order specialist, or others, then collect the ordered item or items and handle the transaction with the customer at a drive-up window, taking money for the ordered item, making change and handing the order to the customer.

The drive-through ordering system is vitally important for a quick service restaurant. In some quick service restaurants, the drive-through is sixty percent (60%) or more of the revenue of the establishment. Thus, there is a great need for a reliable intercom system for use, for example, in obtaining orders from the drive-through facility. If the intercom system develops a fault, becomes mal-adjusted or otherwise malfunctions, the establishment may be unable to process orders from the drive-through facility not only preventing the establishment from booking the revenue which otherwise would have been obtained but also potentially alienating customers.

While systems and methods have been developed in which the order taking process is moved off-site from the establishment, for example, U.S. Patent Application Publication No. US2003/0225622, Doan, entitled "Method and System For Entering Orders of Customers," such systems may not prevent a problem locally associated with the intercom system of the establishment from disrupting communication.

Furthermore, many intercom systems utilize wireless techniques to facilitate communication among staff of the establishment. Such wireless intercom systems can have parameters, such as volume or gain, which affect the ability of the intercom system to function well and reliably. Such intercom systems can, over time, either through changing conditions, personnel, inappropriate adjustment, for example, become unreliable and/or inoperable.

Adding to the difficulty in establishing and maintaining a reliable and effective intercom system, is that establishment utilizing such intercom systems have become ubiquitous in many geographic areas, including communities in which highly-skilled personnel trained in the maintenance and repair of such intercoms are non-existent. Such personnel can often be located a considerable distance away from the site of the establishment, often a number of hours apart. Any failure or other inoperability of the intercom system in such a geographic location could result in a significant downtime for the intercom system and for the establishment to obtain a significant portion of their revenue until the such time as a maintenance and/or repair person can travel to the establishment. Even if the establishment is not distant from the location of service personnel, sending service personnel on a service call results in a significant expense, both in terms of money but also in the time expended to perform any required repair.

BRIEF SUMMARY OF THE INVENTION

Aspects of the present invention allow the intercom system of an establishment to be remotely adjusted by a technician or other user without the need for such technician or other user to be dispatched to the establishment itself, saving both a considerable amount of both time and money.

A technician, or other user, may access the intercom system, for example, via the internet, from great distances and may be able to immediately remedy any of a number of adjustment-based issues. Further, the intercom system itself may be able to self-report fault conditions, such as errors in hardware, errors in software and errors in adjustment, for example, or warn of possible service needs at the time of or prior to system failure. This is of great value to the establishment as it may prevent costly downtime to the establishment.

In an embodiment, the present invention provides a remotely configurable wireless intercom system for an establishment having a staff. A base station is connectable to a wide area communication network. A plurality of headsets are in two-way wireless communication with the base station. Wireless communication between each of the plurality of headsets and the base station are configurable with at least one parameter being adjustable by the staff of the establishment. The parameter is remotely reviewable and being remotely adjustable via the wide area communication network.

In an embodiment, the present invention provides a method of providing a remotely configurable wireless intercom system for a establishment having a staff, having a base station connectable to a wide area communication network and having a plurality of headsets in two-way wireless communication with the base station. Wireless communication is configured between each of the plurality of headsets and the base station with at least one parameter being adjustable by the staff of the establishment. The parameter is remotely reviewed and adjusted via the wide area communication network.

In an embodiment, the system also includes a plurality of parameters, at least one of the plurality of parameters being adjustable by the staff of the establishment. The plurality of parameters are remotely adjustable via the wide area communication network.

In an embodiment, the plurality of parameters are grouped into a template of parameters.

In an embodiment, the template is saved for future recall.

In an embodiment, the template is saved locally at the establishment.

In an embodiment, the template is saved to a location remote from the establishment.

In an embodiment, the plurality of parameters may be restored from the template previously stored.

In an embodiment, the plurality of parameters may be remotely restored from the template previously stored remotely from the establishment.

In an embodiment, the template is derived from another establishment.

In an embodiment, the template of the plurality of parameters is established in conjunction with installation of the wireless intercom system and is saved.

In an embodiment, the template of the plurality of parameters established in conjunction with installation is recalled at a point in time following the installation.

In an embodiment, the template of the plurality of parameters is established as a factory default.

In an embodiment, the template of the plurality of parameters established as default is recalled at a point in time following establishment.

In an embodiment, wireless communication is established between an ordering point and at least one of the plurality of headsets.

In an embodiment, a remote facility monitors communication on the wireless intercom system.

In an embodiment, the parameter is adjusted by the remote facility in response to monitoring of communication of the wireless intercom system.

In an embodiment, the establishment comprises a quick service restaurant.

In an embodiment, the parameter is an audio level.

In an embodiment, the present invention provides a remotely configurable wireless intercom system for an establishment having a staff. A base station is connectable to a wide area communication network. A plurality of headsets is in two-way wireless communication with the base station. Wireless communication between each of the plurality of headsets and the base station is configurable with at least one parameter being remotely reviewable via the wide area communication network. The parameter is remotely re-settable via the wide area communication network.

In an embodiment, the present invention provides a method of providing a remotely configurable wireless intercom system for a establishment having a staff, having a base station connectable to a wide area communication network and having a plurality of headsets in two-way wireless communication with the base station. Wireless communication is configured between each of the plurality of headsets and the base station. At least one parameter is remotely reviewed via the wide area communication network. It is remotely determined if a fault condition exists with the plurality of parameters. If a fault condition exists, the parameter is reset to a predetermined value via the wide area communication network.

In an embodiment, the parameter is reset upon the detection of a fault condition via the wide area communication network.

In an embodiment, the parameter is adjustable by the staff of the establishment.

In an embodiment, wireless communication between each of a plurality of headsets, a base station with a plurality of parameters, a speaker configured to be located near a menu board, and a microphone configured to be located near a menu board is configured. At least one of the plurality of parameters is configured for local adjustment. The base station is connected to a wide area network, and at least one of the plurality of parameters is adjusted via the wide area network.

In another method embodiment, wireless communication between each of a plurality of headsets and a base station is configured with at least one parameter such as an audio level. Such parameter can be configured for local adjustment. The at least one parameter can be remotely reviewed and adjusted via a wide area communication network.

In yet another method embodiment, wireless communication is configured between each of a plurality of headsets and a base station. A plurality of parameters can be adjustable by staff of an establishment. The plurality of parameters are remotely reviewed and adjusted via a wide area communication network, and are grouped into a template of parameters.

In an embodiment a method can also have the step of determining if a fault condition exists.

In an embodiment a method can also have the step of remotely reviewing and adjusting a parameter relevant to a vehicle detection alert.

In an embodiment a method can also have the step of recalling the template to reset the wireless communication.

In a system embodiment, a drive-though, quick service restaurant facility has a plurality of headsets and a base station that configured for communication with the plurality of headsets. A speaker can be associated with the drive-through facility, be located near a menu board, and is configured for communication with the base station. A microphone is also configured to be located near the menu board and for communication with the base station. A plurality of parameters controls configuration of the intercom system. The base station is connectable to a wide area communication network in order to enable remote adjustment of the plurality of parameters.

In another system embodiment, a base station is in two-way wireless communication with a plurality of headsets. The wireless communication is configurable with at least one parameter that is locally adjustable. The parameter is also remotely adjustable via a wide area communication network. The parameter can be an audio level.

In yet another system embodiment, a base station is configured for two-way wireless communication with a plurality of headsets, where such communication is configurable with a plurality of parameters that are remotely adjustable via a wide area communication network and grouped into a template of parameters. At least one of the parameters are adjustable by staff of an establishment.

In an embodiment, the system has software that is configured to determine if a fault condition exists in the system.

In an embodiment, at least one parameter of the plurality of parameters is relevant to a vehicle detection alert.

In an embodiment, at least one parameter of the plurality of parameters is relevant to volume of the speaker.

In an embodiment, at least one parameter comprises a drive-through lane assignment.

In an embodiment, the plurality of parameters is grouped into a template. The template can be a default. The template can be a factory default. The template can be configured for recall to reset the system.

BRIEF DESCRIPTION OF THE DRAWINGS

FIG. 2 is flow chart illustrating monitoring of intercom communications and remote adjustment of intercom system parameters;

FIG. 3 is a flow chart illustrating storage of and subsequent recall of intercom system parameters.

DETAILED DESCRIPTION OF THE INVENTION

Intercom systems, e.g., wireless intercom systems, used at establishments, e.g., quick service restaurants, typically can have several parameters which govern the operation of the intercom system.

Figure 1:
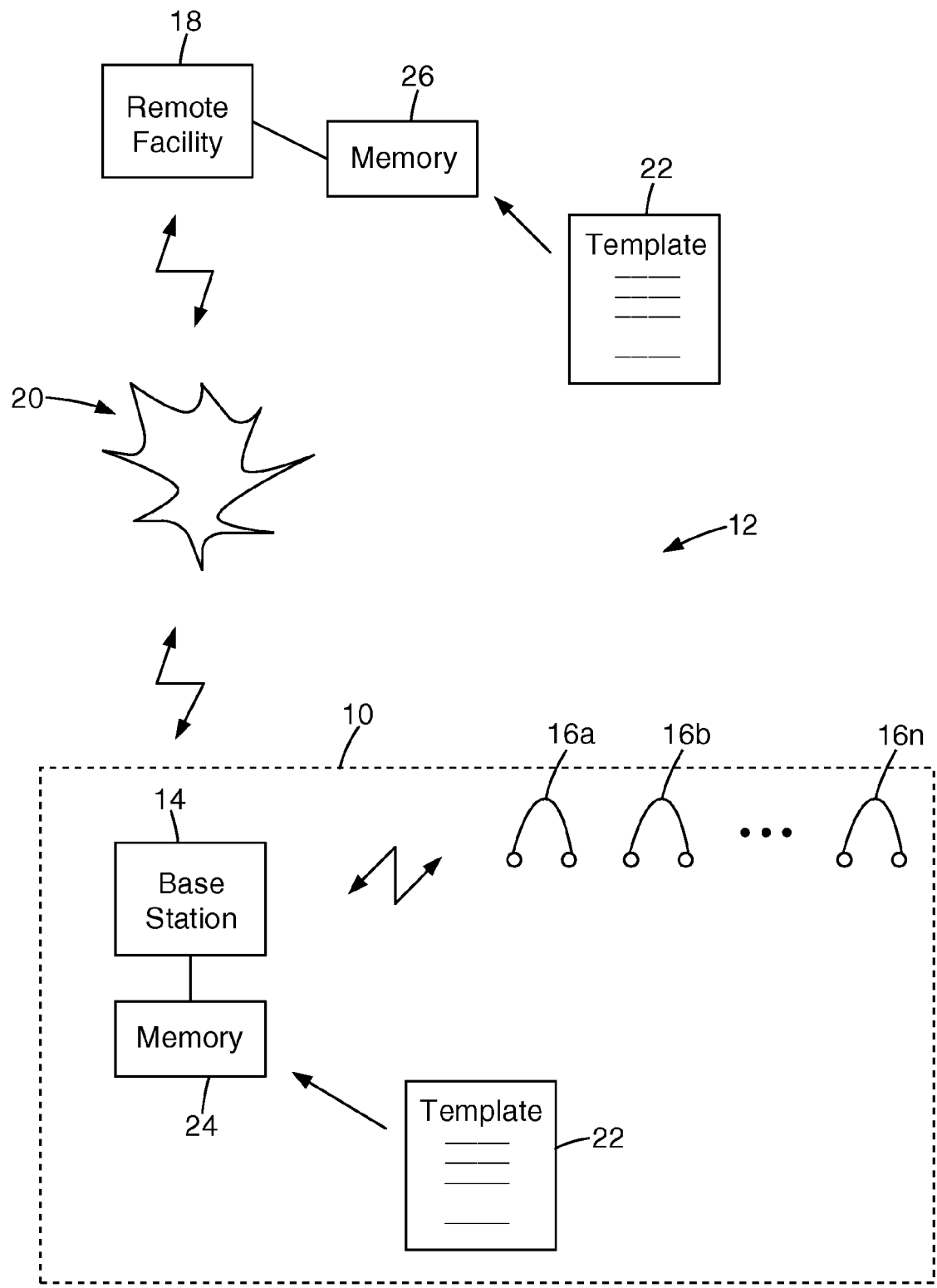
FIG. 1 is a block diagram of the functional components of an intercom system.

As shown in FIG. 1, establishment 10 is served by intercom system 12. Base station 14 communicates wirelessly with a plurality of headsets 16a, 16, . . . 16n. Headsets 16a, 16, . . . 16n are worn by personnel, or staff of establishment 10 and, in a preferred embodiment can be used by such personnel to receive orders taken from a drive-through facility (not shown). At least one of the staff members communicates with a customer in the drive-through facility to obtain an order from the customer. This staff members may be wearing, and communicating through, one of headsets 16a, 16, . . . 16n or may be in wired communication with base station 14. Other staff members will wear headsets 16a, 16, . . . 16n or the remaining ones of headsets 16a, 16, . . . 16n, primarily to listen, or monitor communication between the customer and staff member taking the order.

Intercom system 12 at establishment 10, e.g., a quick service restaurant, has several parameters which govern the operation of the system. For example, each of headsets 16a, 16, . . . 16n can be in full duplex communication with base station 14 and each of headsets 16a, 16, . . . 16n may have a receive audio level, or volume, and/or a transmit audio level associated with it. Separate volume, or gain, controls, may be available to each of headsets 16a, 16, . . . 16n for each direction of communication. Many other parameters are also possible, such as lane assignment, receive volume, transmit volume, master volume for a speaker associated with the drive-through facility, individual volume for each channel received by the drive-through facility, base station receive volume, base station transmit volume, page, greeter, vehicle detection alert, vehicle approaching alert, for examples. Many, if not all, of these parameters may be available to one or more staff members for individual adjustment.

It is recognized, however, that an intercom system 12 involving a drive-through facility, drive-through lane, a base station 14 and, potentially, several headsets 16a, 16, . . . 16n with each unit located in a potentially unique environment and unique conditions can be complex to set up and adjust properly. Failure to perform proper set-up and balance could result in unsatisfactory operation, e.g., resulting in annoying feedback and/or instability perhaps making communication difficult, if not impossible. Providing a staff member or staff members with adjustment control of at least one parameter, e.g., volume of their headset 16, is desirable to take into account individual speaking patterns and hearing capabilities. However, it is possible for individual adjustments to throw the balance of intercom system 12 and, possibly, to render it unstable and/or unusable.

Since the location of the establishment 10 may be a significant distance geographically from the location of a qualified service technician, it may take a considerable amount of time for such service technician, once summoned, to arrive at the location of establishment 10 in order to begin repairs. In some cases establishment 10 may be located hours away from a service technician. Even if establishment 10 is not located a significant distance from a qualified service technician, sending a service technician on-site to perform a repair can still be a significant expense in terms of both time and money.

However, intercom system 12 allows personnel from establishment 10 to call a technical service facility 18 located remotely from the location of establishment 10.

However, a technical service facility 18 located remotely from the location of establishment 10 may be alerted, by personnel of establishment 10, automatically or by other means, to access the parameters controlling intercom system 12 remotely via a wide area network 20, such as by way of the internet. The service technician may be able to access the parameters associated with intercom system 12, review the parameters of intercom system 12, and potentially make adjustments to the parameters to place intercom system 12 back in operation or to improve the operation of intercom system 12.

The service technician may be able to resolve the issue with intercom system 12 quickly without a need to dispense a service technician to the site of establishment 10. If the site of establishment 10 is remote, many hours of establishment down time may be saved, perhaps even a day if it is necessary to fly or otherwise transport a service technician to a very remote site. Even if the site of establishment is not remote, a service technician may be able to service many more establishments and solve many more issues more efficiently by making remote adjustments than by incurring site visits. Remote adjustment of parameters of intercom system 12 may minimize, or eliminate altogether, service interruption by establishment 10.

It is to be recognized and understood that one or more than one parameter of intercom system 12 may be accessed, reviewed and, potentially, modified or adjusted. One parameter, e.g., the master volume of intercom system 12, may be the only parameter reviewed and/or adjusted. On the other hand, it is also contemplated that multiple parameters may be reviewed, and one or more of the parameters reviewed may be adjusted. For example, the volume levels of all of headsets 16a, 16, . . . 16n may be reviewed. Following review, it may be necessary to adjust the volume level of a single headset 16, say headset 16a, or it may be desirable to adjust the volume of more than one or all of headsets 16a, 16, . . . 16n.

Since multiple parameters may be involved in the setting up, adjusting and balancing of intercom system 12 and because one parameter may have an effect on other aspects of the intercom system, it may be desirable to form multiple parameters into parameter sets. A given set of parameters for intercom system 12 may form a template 22, i.e., a set of parameters for intercom system 12 that, when implemented, will give rise to a particular operational characteristic for intercom system 12. For example, known settings for parameters which provide for a particular response or performance of intercom system 12 or which may typically eliminate common issues associated with maladjustment of parameters may be formed as a template. Such a template of parameters may be utilized, for example, either in a later point in time in the same establishment or another establishment having a similar intercom system 12 or a similar facility, structure and/or layout.

Individual parameters or a template 22 or templates of parameters may be saved or stored for later recall. Template 22 may be saved to memory 24 located locally with respect to establishment 10. Once saved in memory 24, template 22, or one of a plurality of templates 22, may be recalled later to reset intercom system 12 or to bring about a desired change of operational parameters. If intercom system 12 parameters are adversely adjusted, then a previously stored template may be recalled from memory 24 and utilized to provide a new operational guidebook for intercom system 12. In particular, a service technician, located remote from the location of establishment 10, may access memory 24 and recall a template 22 previously stored and make the parameters associated with that template 22 active. Additionally, a remotely located service technician may recall a previously stored template 22 from memory 24 and then, perhaps, make further adjustments or modifications to one or more individual parameters in order to improve or optimize the performance characteristics of intercom system 12.

It is also contemplated that parameters for establishment 10 may be stored remotely from establishment 10. For example, the same wideband communication network allowing a service technician at remote facility 18 to access parameters of intercom system 12 may also or alternatively used to transmit parameters, preferably in a template 22, to remote facility to be saved or stored in memory 26. Such parameters or templates 22 may be subsequently recalled as discussed to bring about an operational scheme for intercom system 12 as discussed above with respect to locally stored parameters and/or templates 22. Further, memory 26 associated with remote facility 18 may be used to store a template or templates 22 which may apply to more than one of establishments such as establishment 10. For example, a particular brand or chain of establishment may store a template 22 that may be pertinent for a "standard" quick service restaurant of which many may be constructed in different locations. Thus stored, it would be relatively easy for a service technician to recall the template 22 in order to initially setup and make intercom system 12 operational in a new location or a new establishment meeting that brand's or chain's "standard" layout. As above, of course, the service technician may fine tune the operational parameters for intercom system 12. However, the standard template 22 may have provided the service technician with a substantial head start and made the entire process easier and faster. It is to be recognized and understood that while memory 26 is illustrated connected directly to remote facility 18, that memory 26 may also be remote, not only from establishment 10, but also from remote facility 18. Memory 26 may be physically located in remote facility 18 or may be located elsewhere and accessed by remote facility 18 remotely.

Communication occurring on intercom system 12 may be monitored by other personnel in or associated with establishment 12, either by listening through base station 14 or one or more of headsets 16a, 16, . . . 16n. In the alternative or in addition, personnel associated with remote facility 18 may monitor communication occurring on intercom system 12, particularly communication used in receiving orders from customers. Such personnel associated with remote facility 18, in addition to performing normal quality control of ordering functions, may also analyze the quality of the communications and may preemptively access parameters associated with intercom system 12 and adjust or modify such parameters, if desired, to maintain or improve the operational characteristics of intercom system 12. In this case, personnel associated with establishment 10 do not need to request assistance from a service technician and may not even know that a service technician from remote facility 18 performed service on intercom system 12.

Further, intercom system 12 may contain hardware and/or software used for the purpose of determining if a fault condition exists, i.e., that it is desired that a service technician inspect intercom system 12. If so, intercom system 12 may notify a service technician at remote facility 18 of the existence of a fault condition as determined by commonly available hardware and/or software and a service technician at remote facility 18 may review parameters and/or other aspects of intercom system 12 remotely. The service technician may be able to adjust and/or repair intercom system 12, again preemptively, by reviewing and/or adjusting or modifying parameters associated with intercom system 12.

FIG. 2 is a flow chart illustrating a method of remotely configuring a wireless communication system, such as that used in intercom system 12 of establishment 10. The wireless intercom system is configured (110), in part by setting the parameters associated with the system. Such configuration can be done locally through conventional techniques or by recalling or installing a template 22, may be done remotely, e.g., using remote facility 18, or in any other way. Once configured, the wireless intercom system is then ready to perform communications (112) for establishment 10. Optionally, communications occurring on the wireless intercom system may be monitored (114), either locally or remotely as, for example, by remote facility 18. In response to a request from establishment 10, in response to an indication of a fault condition or preemptively, remote facility 18 remotely reviews (116) communication parameters associated with the wireless intercom system by way of wideband communications network 20. A service technician, or automated equipment, associated with remote facility 18 may then analyze the setting of such parameters and the operation of the wireless intercom system and, if necessary, may remotely adjust or modifying (118) one or more of the communication parameters. Typically such adjustment is performed in order to improve the operation of the wireless intercom system or in order to make the wireless intercom system operational.

FIG. 3 is a flow chart illustrating a method of configuring a wireless intercom system with saved and subsequently recalled parameters. The wireless intercom system is configured (130), in part by setting communication parameters associated with the system. Again, such configuration can be locally through conventional techniques or by recalling or installing a template 22, may be done remotely, e.g., using remote facility 18, or in any other way. Once configured, the wireless intercom system is then ready to perform communications for establishment 10. Communication parameters associated with the wireless intercom system are saved (132), either in local memory or memory located remote from establishment 10. Such parameters are preferably saved as a set of parameters in a template 22. Subsequent to saving such parameters, one or more of such parameters are recalled (134) from memory and utilized to establish, at least in part, the operational characteristics of the wireless intercom system. Once established, the wireless intercom system may then be utilized to communicate (136) in the operational environment of the establishment.

Figure 4:
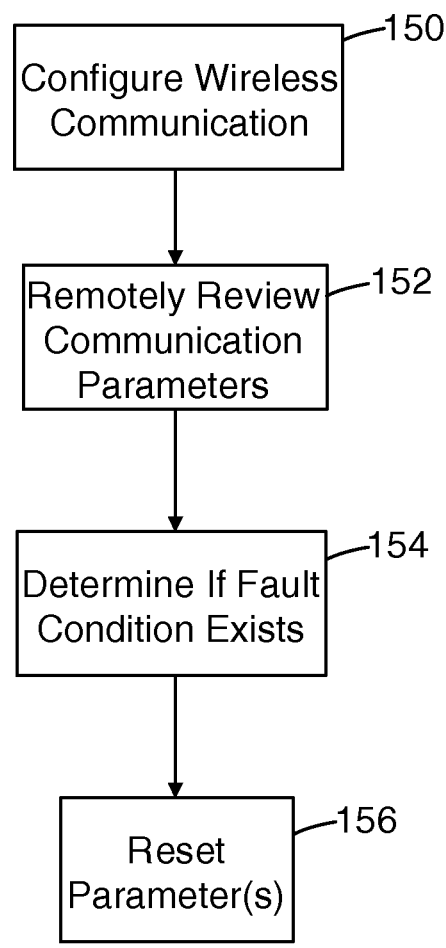
FIG. 4 is a flow chart illustrating remote review of intercom system fault conditions and remote resetting of such parameters.

FIG. 4 is a flow chart illustrating a method of remotely configuring a wireless intercom system responsive to a fault condition. The wireless intercom system is configured (150), in part by setting communication parameters associated with the system. Again, such configuration can be done locally through conventional techniques or by recalling or installing a template 22, may be done remotely, e.g., using remote facility 18, or in any other way.

Remote facility 18 remotely reviews (152) communication parameters associated with the wireless intercom system by way of wideband communications network 20. A service technician, or automated equipment, associated with remote facility 18 may then analyze the setting of such parameters and the operation of the wireless intercom system to determine (154) if a fault condition exists. A fault condition could be the result of one or more inappropriate settings of communication parameters or another hardware and/or software fault condition. Upon determination of a fault, remote facility may then reset (156) the communication parameters associated with the wireless communication system in order to attempt to eliminate the fault condition.

Thus, embodiments of the remotely configurable wireless intercom system for an establishment are disclosed. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. An intercom system being configurable for an establishment having a drive-through ordering point and a staff comprising:
   a base station configured to connect to a wide area communication network;
   at least one headset configured for two-way wireless communication with the base station;
   the wireless communication between the at least one headset and the base station being configurable with at least one parameter comprising volume level of communications wirelessly received or wirelessly transmitted by the headset;
   wherein the base station is further configured such that the at least one parameter is locally adjustable at the establishment and remotely reviewable and adjustable from a facility remote from the location of the establishment when the base station is connected to the wide area communication network; and
   wherein the at least one parameter can be saved into a template of parameters for later use.

2. The system of claim 1, wherein the at least one parameter is a plurality of parameters.

3. The system of claim 2, wherein the plurality of parameters further comprises a vehicle alert.

4. The system of claim 1, wherein the template of parameters can be saved locally at the establishment.

5. The system of claim 1, wherein the template of parameters can be saved to a location remote from the establishment.

6. The system of claim 1, wherein the template of parameters is a default.

7. The system of claim 1, wherein the template of parameters is a factory default.

8. The system of claim 1, wherein the template of parameters is configured for recall to reset the system.

9. The system of claim 2, wherein the plurality of parameters comprises a first parameter and a second parameter, wherein the first parameter comprises a volume level of communications emitted by a speaker in the headset, and wherein the second parameter comprises a volume level of communications emitted by a speaker in a drive-through lane.

10. The system of claim 1, wherein the at least one headset is a plurality of headsets.

11. The system of claim 2, wherein the plurality of parameters comprises volume levels of communications between the headset and an ordering point in a drive-through lane.

12. The system of claim 1, further comprising a speaker and a microphone configured for two-way communication with the base station, wherein the speaker and microphone are further configured for installation in a drive-through lane outside of the establishment.

13. The system of claim 12, wherein the speaker and the microphone are configured to be hard-wired to the base station.

14. The system of claim 1, wherein the system is configured to determine if a fault condition exists in the system and send a notification of the fault condition to the remote facility.

15. The system of claim 2, wherein one of the plurality of parameters comprises a master volume.

16. The system of claim 11, wherein one of the plurality of parameters comprises a master volume.

17. The system of claim 1, wherein the system is configured to execute remote adjustment of the at least one parameter without local intervention.

18. An intercom system, the intercom system being configurable for a drive-through, establishment having a staff, comprising:
   a base station configured to connect to a wide area communication network;
   a plurality of headsets configured for two-way wireless communication with the base station;
   wherein the wireless communication between each of the plurality of headsets and the base station being configurable with at least one parameter comprising at least one volume level of communication between each of the headsets and at least one ordering point in a drive-through lane;
   wherein the base station is configured such that the at least one parameter is locally adjustable at the establishment and
   remotely reviewable and remotely adjustable from a facility remote from the location of the establishment when the base station is connected to the wide area communication network; and
   wherein the at least one parameter for each of the plurality of headsets is grouped into a template of parameters that can be saved for later use.

19. The system of claim 18, further comprising a speaker and a microphone configured for installation in the at least one ordering point, wherein the speaker and microphone are positioned near a menu board and are configured for communication with the base station.

20. The system of claim 18, wherein the template of parameters can be saved locally at the establishment.

21. The system of claim 18, wherein the template of parameters can be saved to a location remote from the establishment.

22. The system of claim 18, wherein the template of parameters is a default.

23. The system of claim 18, wherein the template of parameters is a factory default.

24. The system of claim 18, wherein the template of parameters is configured for recall to reset the system.

25. The system of claim 18, wherein the at least one parameter is a plurality of parameters.

26. The system of claim 25, wherein the plurality of parameters comprises a first parameter and a second parameter, wherein the first parameter comprises a volume level of communications emitted by a speaker in one of the plurality of headsets, and wherein the second parameter comprises a volume level of communications emitted by a speaker of the ordering point.

27. The system of claim 25, wherein the plurality of parameters further comprises a vehicle alert parameter.

28. The system of claim 19, wherein said the speaker and microphone are configured to be hard-wired to the base station.

29. The system of claim 18, wherein the system is configured to determine if a fault condition exists in the system and send a notification of the fault condition to the remote facility.

30. The system of claim 25, wherein one parameter of the plurality of parameters comprises a master volume.

31. The system of claim 27, wherein one parameter of the plurality of parameters comprises a master volume.

32. The system of claim 18, wherein the system is configured to execute remote adjustment of the at least one parameter without local intervention.

* * * * *

UNITED STATES PATENT AND TRADEMARK OFFICE
CERTIFICATE OF CORRECTION

| | | |
|---|---|---|
| PATENT NO. | : 9,020,553 B2 | Page 1 of 1 |
| APPLICATION NO. | : 14/186986 | |
| DATED | : April 28, 2015 | |
| INVENTOR(S) | : Steven Awiszus | |

It is certified that error appears in the above-identified patent and that said Letters Patent is hereby corrected as shown below:

Claims

<u>Column 10</u>
Line 48, in Claim 19, delete "point ," and insert -- point, --, therefor.

Signed and Sealed this
Twenty-third Day of February, 2016

Michelle K. Lee
*Director of the United States Patent and Trademark Office*